H. G. PANTON.
CHICKEN COOP AND NEST.
APPLICATION FILED MAR. 19, 1909.
936,154.
Patented Oct. 5, 1909.
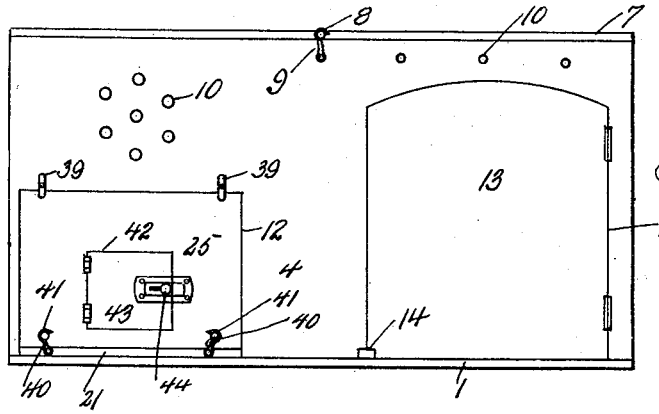
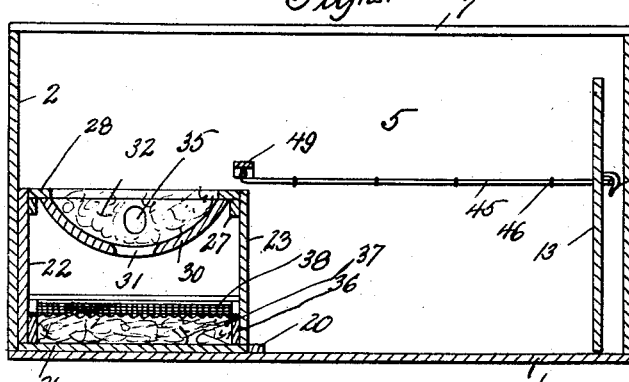
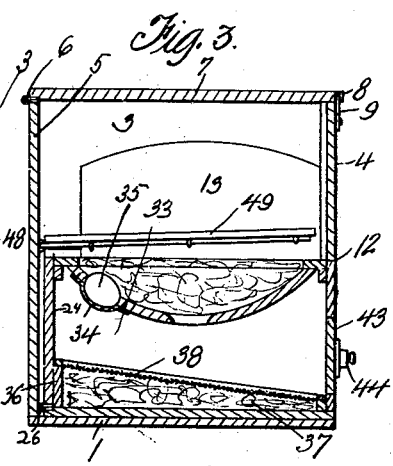
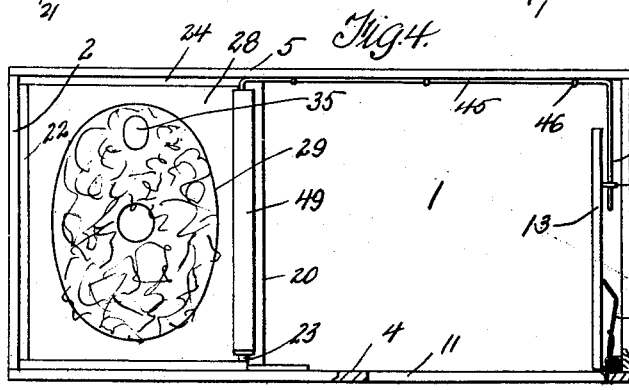
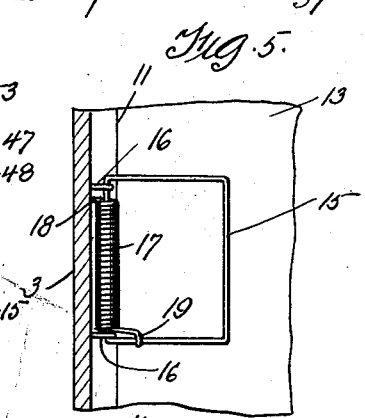
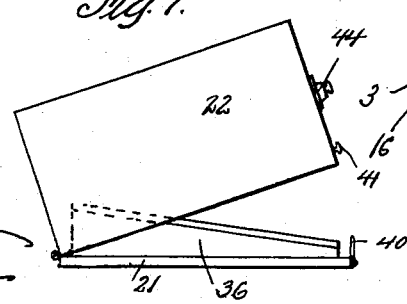
Witnesses
Inventor
H. G. Panton.
By
Attorneys

UNITED STATES PATENT OFFICE.

HUGH G. PANTON, OF PITTSBURG, PENNSYLVANIA.

CHICKEN COOP AND NEST.

936,154.  Specification of Letters Patent.  Patented Oct. 5, 1909.

Application filed March 19, 1909. Serial No. 484,417.

*To all whom it may concern:*

Be it known that I, HUGH G. PANTON, a citizen of the United States of America, residing at Pittsburg, in the county of Allegheny and State of Pennsylvania, have invented certain new and useful Improvements in Chicken Coops and Nests, of which the following is a specification, reference being had therein to the accompanying drawing.

This invention relates to a chicken coop and nest, and the objects of the invention are, first, to provide a sanitary coop for a chicken; second, to provide a coop with a detachable nest from which eggs can be removed immediately upon being laid; third, to provide a coop with an automatic door for retaining a hen within a coop, thereby rendering it possible to determine the product of a certain chicken; fourth to provide a simple and durable chicken coop that can be used as a unit in a hen house or separately at a desired location; and fifth, to provide a nest with a gathering receptacle in which eggs can be accumulated as fast as laid.

The above objects are accomplished by a structure that permits of an accurate record being maintained of the hens laying eggs, and the number of eggs laid by each hen, besides preventing any particular hen from sitting upon eggs after being laid.

The detail construction entering into my invention will be hereinafter more fully described, and then specifically claimed, and reference will now be had to the drawings forming part of this application, wherein there is illustrated the preferred embodiments of the invention, but it is to be understood that the structural details thereof can be varied or changed without departing from the spirit or scope of the invention.

In the drawings, Figure 1 is a front elevation of a coop and nest constructed in accordance with the invention, Fig. 2 is a longitudinal sectional view of the same, Fig. 3 is a cross sectional view of the nest, Fig. 4 is a plan of the same, partly broken away and partly in section, with the cover thereof removed, Fig. 5 is an enlarged detail sectional view of a portion of the coop illustrating the spring-pressed door thereof, Fig. 6 is a horizontal sectional view of the same, and Fig. 7 is a cross sectional view of the nest detached and in an open position.

In the accompanying drawings, I have illustrated a rectangular box or structure comprising a bottom 1, end walls 2 and 3, a front wall 4, and a rear wall 5. Hinged to the rear wall 5, as at 6, is a cover 7 having the forward edge thereof provided with a pin 8 adapted to be engaged by a hook 9, pivotally connected to the wall 4 adjacent to the upper edge thereof.

The front wall 4 is provided with a plurality of ventilating openings 10, a door opening 11, and a drawer opening 12.

Hinged to the front wall 4 is a door 13 for closing the door opening 11, the outward movement of said door being limited by a lug 14 fixed to the front wall 4 adjacent to the bottom 1. The inward movement of the door 13 is limited by the end wall 3, and to normally maintain said door in a closed position and in engagement with the lug 14, a spring yoke 15 is used. This yoke is supported by staples 16 mounted in the end wall 3 adjacent to the door opening 4. Encircling that portion of the yoke 15 held by the staple 16 is a coil spring 17 having one end thereof bearing against the end wall 3, as at 18, while the opposite end thereof engages the yoke, as at 19.

Arranged transversely of the bottom 1 of the coop and alining with the edge of the drawer opening 12 is a cleat 20. Slidably mounted upon the cleat 20 and the end wall 2, is a drawer, said drawer comprising a base 21, side walls 22 and 23, a rear wall 24 and a front wall 25. These walls are connected together, and the rear wall 24 is hinged, as at 26, to the rear edge of the base 21.

Secured to the inner sides of the walls 22 to 25 inclusive, adjacent to the upper edges thereof, are cleats 27, and mounted upon said cleats is a nest, comprising a plate 28 having an oval opening 29 formed therein, and supported by the under side of the plate 28 is a concaved seat 30 for a central opening 31. The concaved seat 30 is covered with excelsior or similar soft material 32. The seat 30, adjacent to the opening 31 thereof is provided with an additional opening 33 closed by an egg socket 34, carried by the seat 30, said socket being designed for an artificial egg 35 adapted to protrude through the opening 33 and through the soft material 32 carried by the seat 30.

Upon the base 21 of the drawer is hinged an inclined gathering frame 36 of a less area than the base 21 whereby the walls 22 to 25 inclusive can fit down over the sides of the frame. In the frame 36 is placed excelsior 37 or a similar soft material which is retained within the frame by a piece of netting or wire gauze 38.

The front wall 25 of the drawer is held in engagement with the front wall 4 of the coop or box by clips 39 pivotally connected to the front wall 4 at the upper edge of the drawer opening 12. The wall 25 is retained in engagement with the base 21 by pivot hooks 40, carried by the front edge of the base 21 and adapted to engage pins 41 carried by the wall 25 at the lower edge thereof.

In order that easy access can be had to the inclined frame 36 without removing the drawer, the wall 25 is provided with a door opening 42 having a hinged door 43 normally maintained in a closed position by a latch 44.

In connection with the door 13, I use a trapping mechanism, adapted to maintain the door in an open position until a hen enters the coop, the door being released immediately upon the hen roosting or entering the seat 30.

The trapping mechanism comprises a longitudinal rod 45 journaled in staples 46 carried by the rear wall 5. The end of the rod 45 adjacent to the wall 3 is bent, as at 47, to engage a hook 48, carried by the inner side of the door 13. The rod 45 is arranged in a plane horizontal with the top of the nest and the end of the rod is bent forwardly above the wall 23 of the drawer. Secured to the forwardly bent end of the rod 45 is a roosting bar 49, the function of which will presently appear.

By opening the cover 7, easy access can be had to the interior of the box, to set the hinged spring-pressed door 13 in an open position, whereby a hen can enter the coop for laying or sheltering purposes. This can also be done from door opening 11, thereby allowing two or more boxes to be piled on top of each other. Should the hen desire to enter the nest, she must hop on the roosting bar 49, and the weight of the hen is sufficient to release the door 13 and allow the door to close. As the eggs are laid in the nest, they pass through the opening 31 of the seat 30 onto the inclined frame 38, and roll toward the door 43 which is opened to remove the eggs.

Should it be desired to maintain the door 13 in an open position, in order that the hen can leave the coop, a suitable block can be placed under the forward end of the roosting bar 49 to prevent the same from lowering by the weight of the chicken.

Through the medium of the cover 7, and the detachable drawer, the coop in its entirety can be aired, cleaned and maintained in a sanitary condition.

My improved trapping nest provides a sure and reliable way of determining which hens are laying, which are the best layers, and facilitates the selection of fowls for future breeding. It is a well known fact that fowls have hereditary traits, especially in connection with laying, and in the selection and breeding of chickens for laying purposes, the pedigree of chickens are considered. By means of my trapping nest, I am enabled to eliminate undesirable fowls from those having excellent laying proclivities.

Having now described my invention what I claim as new, is:—

1. A chicken coop and nest embodying a rectangular box, a hinged cover carried thereby, said box having a front wall thereof provided with a door opening and a drawer opening, a spring pressed door hinged in the door opening of said box, a drawer slidably mounted in the drawer opening of said box, said drawer comprising a base, an inclined frame supported by said base, connected walls hinged to the rear edge of said base, a nest supported by the upper edges of said walls, said nest having a central opening formed therein, a hinged door carried by the front wall of said drawer, and a trapping mechanism for releasing said spring-pressed door to allow it to close.

2. A chicken coop and nest, embodying a box, a hinged cover carried by said box, said box having a door opening formed therein, a spring pressed door for closing said opening, a nest detachably mounted in said box, said nest comprising a base, walls hinged to said base, an inclined frame supported by said base, a seat carried by the upper edges of said wall and having a central opening formed therein, and a trapping mechanism for releasing said door to allow it to close.

3. A chicken coop and nest, comprising a box, said box having a door opening formed therein, a spring pressed door hinged in the opening of said box, a drawer slidably mounted in said box, a nest carried by said drawer, said nest having a central opening formed therein, a hinged door carried by said drawer to permit of access being had to said drawer beneath said nest, and a trapping mechanism for releasing said door to allow it to close.

In testimony whereof I affix my signature in the presence of two witnesses.

HUGH G. PANTON.

Witnesses:
A. H. RABSAG,
JAS. V. McMASTER.